L. HAMLIN.
Bee Hive.
No. 3,664. Patented July 13, 1844.
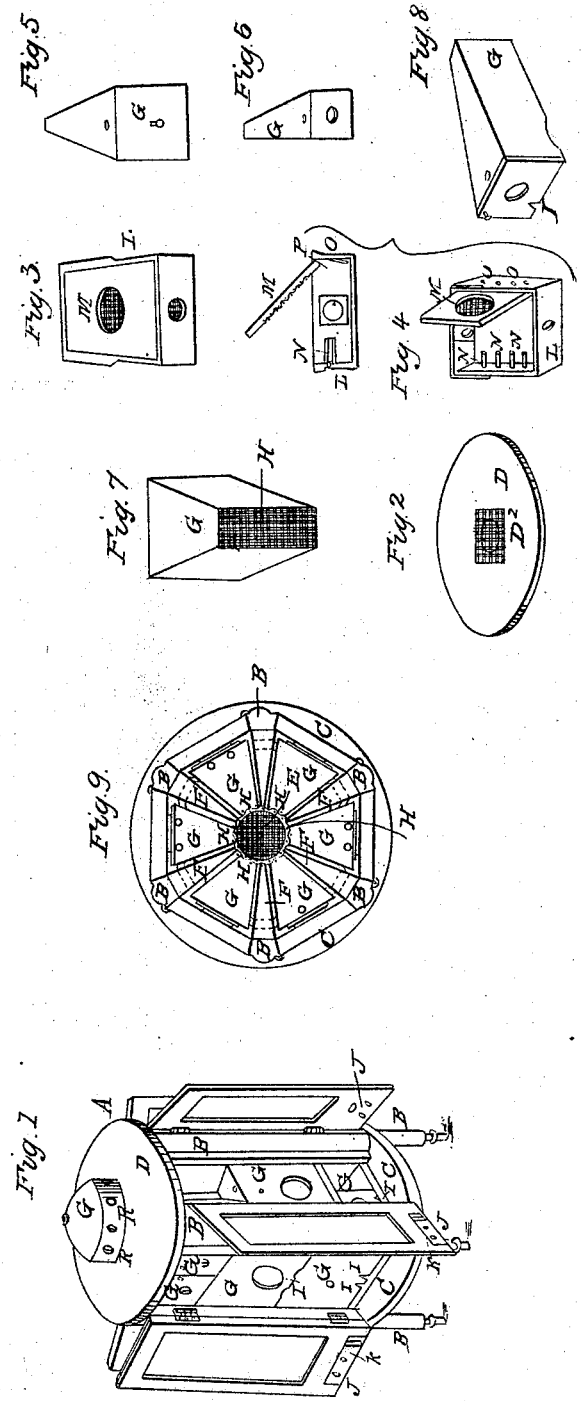

UNITED STATES PATENT OFFICE.

LEMON HAMLIN, OF KIRKERSVILLE, OHIO.

BEE-PALACE.

Specification of Letters Patent No. 3,664, dated July 13, 1844.

*To all whom it may concern:*

Be it known that I, LEMON HAMLIN, of Kirkersville, Licking county, State of Ohio, have invented a new and useful Bee-Palace, which is described as follows, reference being had to the annexed drawings of the same, making part of this specification.

Figure 1 is a perspective view of the palace—the doors being open to show the hives; Fig. 2 the bottom of the upper miller trap; Fig. 3 the exterior of the lower moth trap; Fig. 4 view of the interior of ditto; Fig. 5 one of the hives detached from the palace; Fig. 6 a triangular drawer; Fig. 7 view of the wire gauge over the back of the hive; Fig. 8 side of one of the scalloped hives; Fig. 9 horizontal section of the palace.

This bee palace A is built externally the form of a polygon, square or circle of any desirable size having several columns, pillars or posts B arranged in a circle in the maner of a circular temple resting on a base C and supporting a dome or top D, said palace having a circular space E called the ventilator in the center extending from the bottom of the base to the top of the dome, the space between the said central ventilator and the columns being partitioned off into a circle of trapezoidal shaped apartments by radial partitions F extending from the columns to the ventilator, into which apartments are inserted the hives G for the bees to deposit their honey of a corresponding trapezoidal shape one above another and of various sizes open at the back and covered with wire or other gauze H communicating with the central ventilator E and open or perforated at the bottom to allow of a free ascent and descent of the bees from one box to another each hive or box being provided with a handle by which to draw it out from or restore it to its position in the palace apertures I being left in the front of the hives corresponding with similar apertures J in the doors of the palace at which the bees enter and leave the hives—which doors are hung between the columns of the palace and kept locked or unlocked. The aforesaid apertures in the doors of the palace are opened or closed at pleasure by means of slides K. At night they are kept closed to exclude the miller.

At the base of the palace and directly under the ventilator and communicating therewith through a wire gauze is arranged a box L called a moth trap. It is of a rectangular form and larger than the ventilator covered on the top by wire gauze M through which the air circulates and upward through the ventilator E first entering the trap through apertures in the sides of the trap into which horizontal tubes N are inserted and other apertures o over which a valve of gauze P is hinged on the inside. The tubes N are of a tapered form and project inside the trap. When the moth enters the trap through these tapered tubes he finds his farther entrance to the palace cut off by the aforesaid horizontal sheet of wire gauze M. In attempting to escape from the trap he finds his exit is prevented by the tapered form of the tubes N not permitting his extended wings to pass through. When he enters the trap on the side where the gauze valve P is hinged he first enters the apertures o in the side of the trap, pushes the gauze valve inward and passes by or under it, being in the trap the valve springs back to its former position which shuts off his escape. The millers are destroyed by pouring hot water into the trap and discharged through the top which is hinged to the side for that purpose. The trap slides in grooves on the under side of the palace and is glazed to admit light.

The trap Q over the top of the central ventilator E is made in the form of a cap to the dome, being perforated around its circumference with small apertures R for the entrance of the millers to the space within said cap from whence they are prevented from entering the palace by a horizontal sheet of wire gauze $D^2$ placed over the top of the ventilator E, through the interstices of which, and the aforesaid perforations in the cap the ventilation of the palace is kept up without any danger of the entrance of millers or moths.

What I claim as my invention and which I desire to secure by Letters Patent is—

The manner of ventilating the hives by arranging them around a central vertical opening in the palace—the back of each hive being covered by wire gauze, and in combination with this arrangement the moth trap placed at the top and bottom of said central opening the construction and arrangement being as herein described.

LEMON HAMLIN.

Witnesses:
WM. P. ELLIOTT,
ALBERT E. JOHNSON.